United States Patent
Guillez et al.

(10) Patent No.: US 6,830,282 B2
(45) Date of Patent: Dec. 14, 2004

(54) MOTOR VEHICLE RETRACTABLE ROOF COMPRISING THREE SLIDING PIVOTING ELEMENTS

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/416,323

(22) PCT Filed: Nov. 6, 2001

(86) PCT No.: PCT/FR01/03435
§ 371 (c)(1),
(2), (4) Date: May 6, 2003

(87) PCT Pub. No.: WO02/36373
PCT Pub. Date: May 10, 2002

(65) Prior Publication Data
US 2004/0021338 A1 Feb. 5, 2004

(30) Foreign Application Priority Data
Nov. 6, 2000 (FR) .......................................... 00 14181

(51) Int. Cl.⁷ ................................................. B60J 7/14

(52) U.S. Cl. ............................ 296/107.08; 296/107.17; 296/107.18

(58) Field of Search ............................ 296/107.01, 108, 296/107.07, 107.08, 107.17, 107.18, 107.2

(56) References Cited

U.S. PATENT DOCUMENTS

| | | | | |
|---|---|---|---|---|
| 2,704,225 A | * | 3/1955 | Anschuetz, et al. | 296/108 |
| 5,979,970 A | * | 11/1999 | Rothe et al. | 296/107.17 |
| 6,053,560 A | * | 4/2000 | Rothe | 296/107.17 |
| 2002/0135200 A1 | * | 9/2002 | De Gaillard | 296/107.2 |

* cited by examiner

Primary Examiner—Jason Morrow
(74) Attorney, Agent, or Firm—Nawrocki, Rooney & Silvertson, P.A.

(57) ABSTRACT

A retractable roof for a vehicle has three rigid roof sections. A plurality of links and levers connect the three roof sections. The links and levers along with a slide on at least one roof section control and guide the three roof sections in an optimal manner as they move from a closure position covering a cabin of the vehicle to a storage position in a rear boot of the vehicle. The dimensions of the roof sections and boot allow the roof sections to fit into the boot.

3 Claims, 1 Drawing Sheet

MOTOR VEHICLE RETRACTABLE ROOF COMPRISING THREE SLIDING PIVOTING ELEMENTS

CROSS-REFERENCE TO RELATED APPLICATIONS

None

STATEMENT REGARDING FEDERALLY SPONSORED RESEARCH OR DEVELOPMENT

None

INCORPORATED-BY-REFERENCE OF MATERIAL SUBMITTED ON A COMPACT DISC

None

BACKGROUND OF THE INVENTION

1. Field of the Invention

The present invention concerns a roof which can be retracted or withdrawn into the rear boot of a vehicle.

Such a retractable roof makes it possible in particular to convert a vehicle of the two-seater coupé or four-seater coupé or saloon type into a vehicle of the cabriolet type.

In the case of four-seater coupés or saloons, the roof has a relatively long length, so that the retractable roof is composed of three roof elements, each of which has a length compatible with the dimensions of a rear boot in the vehicle.

2. Description of Related Art including Information Disclosure under 37 CFR 1.97 and 1.98

Thus a retractable roof for a vehicle is known, comprising a front roof element, an intermediate roof element and a rear roof element, these three elements being able to move between a closure position in which they cover a cabin in the vehicle and a position of storage in which they are superimposed substantially horizontally in the rear boot of the vehicle.

The aim of the present invention is to afford improvements to the known means, in order to optimally control and guide the movement of the roof elements between their closure position and their position of storage in the boot.

BRIEF SUMMARY OF THE INVENTION

According to the invention, the retractable roof is characterised in that the movement of the rear element towards the boot is controlled by at least one arm articulated on the chassis of the vehicle and on the rear element, in that the rear element comprises a slide extending between its front and rear edges in which there can engage a finger fixed to the rear edge of the intermediate element so that the intermediate element can slide on the rear element, in that the intermediate element also comprises a slide extending between its front and rear edges in which there can engage a finger fixed to the rear edge of the front element so that the front element can slide on the intermediate element, in that the front edge of the rear element is connected in an articulated fashion to the intermediate element by means of a lever which is itself connected in an articulated fashion to the arm by a link and in that the front edge of the intermediate element is connected in an articulated fashion to the front element by a lever which is itself connected in an articulated fashion by a link to the lever which connects the intermediate element to the front element.

Other particularities and advantages of the invention will also emerge in the following description.

In the accompanying drawings, given by way of non-limiting examples:

BRIEF DESCRIPTION OF THE SEVERAL VIEWS OF THE DRAWING(S)

FIG. 3 is a view similar to FIG. 2 concerning a variant;

DETAILED DESCRIPTION OF THE INVENTION

Figure 1:
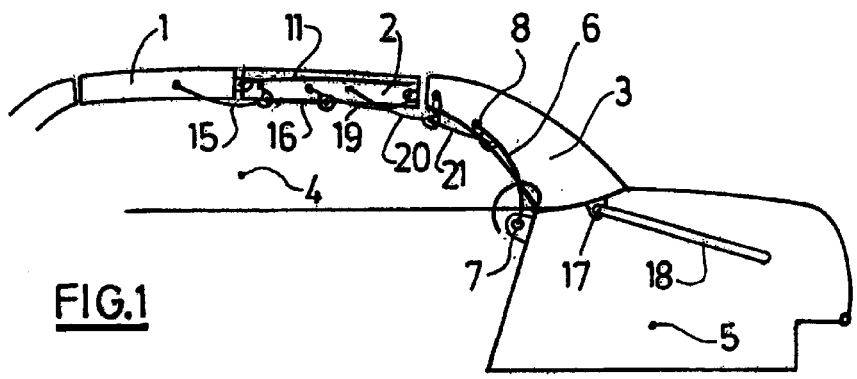
FIG. 1 is a schematic view in partial longitudinal section of a vehicle equipped with a retractable roof according to the invention, in the closed position.

In the embodiment depicted in FIGS. 1 to 4, the retractable roof comprises a front roof element 1, an intermediate roof element 2 and a rear roof element 3. These three elements 1, 2, 3 are able to move between a position in which (see FIG. 1) they cover the cabin 4 of the vehicle and a position in which (see FIG. 4) they are superimposed substantially horizontally in the rear boot 5 of the vehicle.

According to the invention, the movement of the rear element 3 towards the boot 5 is controlled by at least one arm 6 articulated at 7 on the chassis of the vehicle and at 8 on the rear element 3.

Figures 2, 3:
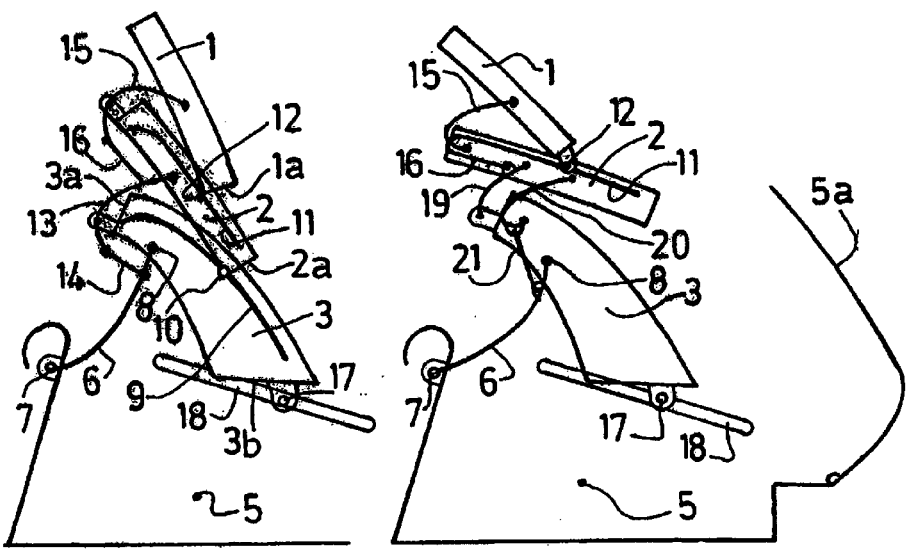
FIGS. 2 and 3 are views similar to FIG. 1 showing two versions of the retractable roof, the latter being in an intermediate position.

It can be seen in FIG. 2 that the rear element 3 comprises a slide 9 extending between its front 3a and rear 3b edges, in which there can engage a finger 10 fixed to the rear edge 2a of the intermediate element 2 so that this intermediate element 2 can slide on the rear element 3.

The intermediate element 2 also comprises a slide 11 extending between its front and rear 2a edges, in which there can engage a finger 12 fixed to the rear edge 1a of the front element 1 so that this front element 1 can slide on the intermediate element 2.

In addition, the front edge 3a of the rear element is connected in an articulated fashion to the intermediate element by a lever 13 which is itself connected in an articulated fashion to the arm 6 by a link 14.

Moreover, the front edge of the intermediate element 2 is connected in an articulated fashion to the front element 1 by a lever 15 which is itself connected in an articulated fashion by a link 16 to the lever 13 which connects the intermediate element 2 to the rear element 3.

In the examples depicted in FIGS. 1 to 4, the movement of the rear element 3 towards the boot 5 is also controlled by a finger 17 carried by the rear part 3b of the rear element 3 slidably engaged in a slide 18 extending inside of the boot 5.

Instead of this finger 17 and this slide 18, the movement of the rear element 3 towards the boot 5 can be controlled by a second arm articulated on the chassis and on the rear part 3b of the rear element 3.

In the variant depicted in FIG. 3, the front element 1 is connected to the intermediate element 2 in the same way as in the version according to FIG. 2.

Likewise, as in the case of FIG. 2, the rear element 3 is moved by an articulated arm 6 and its rear part slides in a slide 18.

On the other hand, the rear roof element 3 does not have any slide. The intermediate roof element 2 is connected to the rear roof element 3 by two articulated levers 19, 20, one of which levers 20 is connected in an articulated fashion by a link 21 to the arm 6.

The version of the retractable roof depicted in FIG. 2 functions as follows:

After unlocking of the elements 1, 2, 3 and opening of the lid 5*a* of the boot 5, the arm 6, whose pivoting is controlled by a motor or an actuator, moves the rear element 3 towards the boot 5. This movement is guided by the finger 17, which slides in the slide 18.

Figure 4:
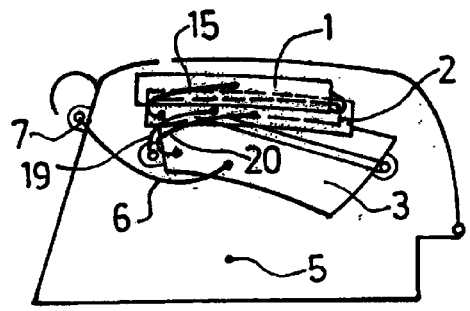
FIG. 4 is a view similar to FIGS. 1 to 3, the retractable roof being in a position stored in the vehicle boot.

The arm 6 in its movement makes the lever 13 connected to the element 2 pivot towards the rear, by means of the link 14. Likewise, the lever 13 drives in its movement, by virtue of the link 16, the lever 15 connected to the element 1. The tilting of the levers 13 and 15 pushes the elements 2 and 1 respectively in the slides 11 and 9 so that the elements 1, 2, 3 are progressively superimposed and then come to be stored substantially horizontally in the boot 5 as indicated in FIG. 4.

In the case of FIG. 3, the rear 3 and front 1 elements move in the same way as in the case of FIG. 2.

The intermediate element 2 is moved upwards and is progressively superimposed on the rear element 3 by virtue of the levers 19, 20, whose upward pivoting is controlled by the link 21, which is driven by the arm 6.

In a simplified version of the invention, particularly in the case of coupés having only two seats, the retractable roof could include only the two elements 2 and 3.

What is claimed is:

1. A retractable roof for a vehicle having a cabin (4) a chassis, and a rear boot (5), comprising a front roof element (1), an intermediate roof element (2) and a rear roof element (3), the three roof elements being able to move between a position in which they cover the vehicle cabin (4) and a position in which they are superimposed substantially horizontally in the rear boot (5) of the vehicle, characterized a) in that the movement of the rear roof element (3) towards the rear boot (5) is controlled by a first arm (6) articulated on the chassis of the vehicle and on the rear roof element, b) in that the rear roof element (3) includes a first slide (9) extending between front and rear edges of the rear roof element (3) and that a first finger (10) fixed to a rear edge of the intermediate roof element (2) so that the intermediate roof element (2) can slide on the rear roof element (3), c) in that the intermediate roof element (2) comprises a second slide (11) extending between front and rear edges of the intermediate roof element in which a second finger (12) fixed to a rear edge of the front roof element engages, (1) so that the front roof element (1) can slide on the intermediate roof element (2), d) in that the front edge of the rear roof element (3) is connected in an articulated fashion to the intermediate roof element (2) by means of a first lever (13) which is itself connected in an articulated fashion to the arm (6) by a link (14), and e) in that a front edge of the intermediate roof element (2) is connected in an articulated fashion to the front roof element (1) by a second lever (15) which is connected in an articulated fashion by a link (16) to the first lever (13) that connects the intermediate roof element (2) to the front roof element (1).

2. A retractable roof according to claim 1, characterised in that the movement of the rear roof element (3) towards the boot (5) is also controlled by a finger (17) carried by a rear part of the rear roof element (3) slidably engaged in a third slide (18) extending inside the boot (5).

3. A retractable roof according to claim 1, characterised in that the movement of the rear roof element (3) towards the boot (5) is further controlled by a second arm cooperating with the first arm (6) and articulated on the chassis and on the rear roof element (3).

* * * * *